(12) United States Patent
Pelekhov et al.

(10) Patent No.: US 6,676,813 B1
(45) Date of Patent: Jan. 13, 2004

(54) TECHNOLOGY FOR FABRICATION OF A MICROMAGNET ON A TIP OF A MFM/MRFM PROBE

(75) Inventors: Denis V. Pelekhov, Los Alamos, NM (US); P. Chris Hammel, Santa Fe, NM (US); Geoffrey Nunes, Jr., Swarthmore, PA (US); Melissa M. Midzor, Camarillo, CA (US); Michael Roukes, Pasadena, CA (US)

(73) Assignee: The Regents of the University of California, Los Alamos, NM (US)

( * ) Notice: Subject to any disclaimer, the term of this patent is extended or adjusted under 35 U.S.C. 154(b) by 107 days.

(21) Appl. No.: 10/097,893

(22) Filed: Mar. 13, 2002

Related U.S. Application Data

(60) Provisional application No. 60/277,190, filed on Mar. 19, 2001.

(51) Int. Cl.⁷ ................................ C23C 14/00
(52) U.S. Cl. ................... 204/192.2; 427/129; 427/130; 427/336
(58) Field of Search ................ 204/192.2; 427/129, 427/130, 336

(56) References Cited

U.S. PATENT DOCUMENTS

| | | | |
|---|---|---|---|
| 5,266,897 A | * 11/1993 | Watanuki et al. | ........... 324/244 |
| 5,448,421 A | 9/1995 | Matsuda et al. | ............... 360/55 |
| 5,465,046 A | * 11/1995 | Campbell et al. | ........... 324/244 |
| 5,866,805 A | 2/1999 | Han et al. | ..................... 73/105 |
| 5,871,885 A | 2/1999 | Roh | ........................... 430/313 |
| 5,900,728 A | 5/1999 | Moser et al. | ............... 324/244 |
| 5,900,729 A | 5/1999 | Moser et al. | ............... 324/244 |
| 5,918,274 A | * 6/1999 | Chen et al. | ................... 73/105 |
| 5,945,898 A | 8/1999 | Judy et al. | ..................... 335/78 |
| 5,966,800 A | 10/1999 | Huai et al. | ............... 29/603.13 |
| 6,118,628 A | 9/2000 | Sano et al. | ................. 360/126 |
| 6,118,629 A | 9/2000 | Huai et al. | .................. 360/126 |
| 6,121,771 A | * 9/2000 | Moser | ........................ 324/244 |
| 6,211,673 B1 | * 4/2001 | Gerber et al. | ............... 324/262 |
| 6,237,399 B1 | * 5/2001 | Shivaram et al. | .............. 73/105 |
| 6,373,246 B1 | * 4/2002 | Tomita et al. | .............. 324/244 |

* cited by examiner

*Primary Examiner*—Stevan A. Resan
(74) *Attorney, Agent, or Firm*—Milton D. Wyrick

(57) ABSTRACT

A method for coating the tip of a mechanical resonator for use in magnetic force microscopy and magnetic resonance force microscopy in which the tip is coated with a ferromagnetic material and the cantilever is not, and the product resulting from the method. A cantilever and incorporated tip are coated with a photoresist, except that surface tension keeps photoresist off the tip. The cantilever and tip are then coated with a magnetic material. Next, acetone is used to lift off the magnetic material from the cantilever but not from the tip.

11 Claims, 2 Drawing Sheets

3. After liftoff:

1. Photo resist spin-coating

2. Magnetic material deposition

3. After liftoff:

TECHNOLOGY FOR FABRICATION OF A MICROMAGNET ON A TIP OF A MFM/MRFM PROBE

This application claims the benefit of U.S. Provisional Application No. 60/277,190 filed Mar. 19 2001, now abandoned.

The present invention generally relates to Magnetic Force Microscopy and to Magnetic Resonance Force Microscopy, and, more specifically to probe tips used in Magnetic Force Microscopy and Magnetic Resonance Force Microscopy. This invention was made with Government support under Contract No. W-7405-ENG-36 awarded by the U.S. Department of Energy. The Government has certain rights in the invention.

BACKGROUND OF THE INVENTION

Magnetic Force Microscopy (MFM) and Magnetic Resonance Force Microscopy (MRFM) use mechanical resonators to discern material features approaching the atomic dimension level. In MFM, a ferromagnetic probe is scanned over a material under test and maps stray magnetic fields close to the surface. Resolution is routinely better than 50 nm, much better than the best optical techniques. Sensitivity is sufficient to image structures at the submicron level. In MRFM, the ferromagnetic tip is scanned over a material under test while an appropriately modulated radio frequency (RF) field is applied by a small coil and magnetic resonance signal from the spins (both nuclear and electron) contained in the sample is detected. Thus, unlike the other scanning probe techniques, MRFM provides a material specific subsurface information about a sample under the study.

As stated, both MFM and MRFM use ferromagnetic tips at the end of a weak double-clamped beam or cantilever that are used as probes to determine surface and other properties of the material under test. Normally, these probes are magnetically sensitized through sputter coating with a ferromagnetic material. In this sputtering process, the entire cantilever and tip are coated with ferromagnetic material. Because of this, the behavior of these cantilevers is problematic. This results from the fact that spatial resolution of the intended measurement is defined to the first order by the characteristic size of the probe magnet. Effective reduction of the size of this probe magnet can be achieved by using a conical or pyramidal tip at the end of the cantilever. However, even with this type of tip, if the total cantilever and tip are made magnetic, the spatial resolution suffers.

Several problems are encountered when the cantilever and tip are coated with ferromagnetic material. When operating at low temperatures and in external RF fields, these problems include: (a) differential thermal contraction between the native material of the cantilever and the coating layer magnetic material, which results in stressing and bending of the cantilever; (b) the presence of the layer of metallic ferromagnetic material results in parasitic heating of a cantilever in an external RF field; and (c) excessive magnetic material on the cantilever results in significant resonant frequency shifts in external magnetic fields. Therefore, a significant need exists for limiting the ferromagnetic layer to the tip of the cantilever in order to avoid these problems.

It is therefore an object of the present invention to provide a cantilever and tip that provides accurate information on a material under test.

It is another object of the present invention to provide a method for assuring that magnetic material is only on the tip of a cantilever used in MFM and MRFM.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a method of producing a layer of thin ferromagnetic coating on the tip of a cantilever used as a mechanical resonator in magnetic resonance force microscopy and magnetic force microscopy comprises the steps of spinning the cantilever in the presence of a photoresist such that the photoresist spreads along the cantilever but not onto the incorporated tip; sputtering a ferromagnetic layer onto the cantilever and the incorporated tip; removing the ferromagnetic layer from the cantilever, but not from the incorporated tip.

In a further aspect of the present invention, and in accordance with its principles and purposes, a mechanical resonator for use in magnetic force microscopy and in magnetic resonance force microscopy comprises a cantilever with an incorporated tip, the incorporated tip being coated with a layer of ferromagnetic material.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides method and apparatus for providing mechanical resonators made up of cantilevers and tips for MFM and MRFM where only the tips have a layer of magnetic material. The invention may be most easily understood through reference to the drawings.

Figure 1:
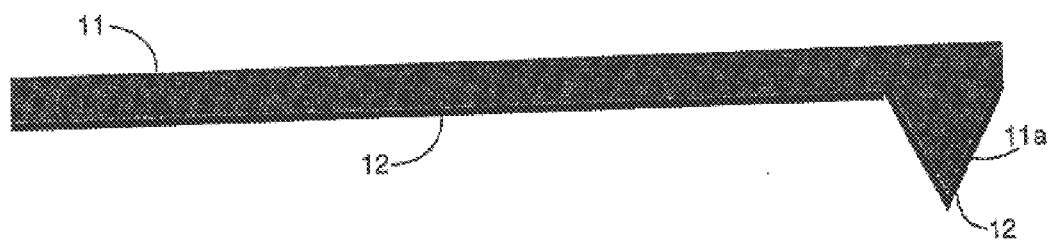
FIG. 1 is a drawing of a currently manufactured mechanical resonator made up of a cantilever and tip illustrating the coating with a magnetic material along the cantilever and covering the tip.

Initially referring to FIG. 1, there can be seen a drawing of a currently available cantilever 11 and tip 11a. As shown, the entire cantilever 11 and tip 11a are coated with magnetic material 12. Having magnetic material 12 along the entire surface of cantilever 11 and tip 11a affects the spatial resolution of cantilever 11 in a deleterious manner.

Figure 2A:
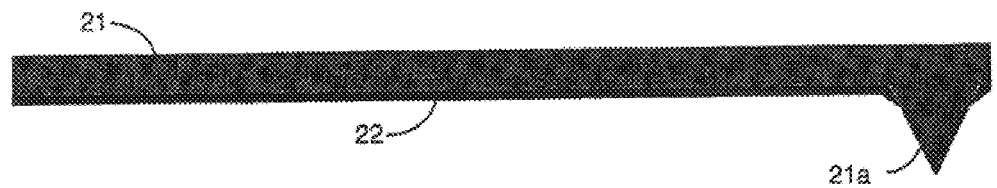
FIGS. 2A–2C are drawings illustrating the steps involved in producing mechanical resonators according to the present invention.
Figure 2B:
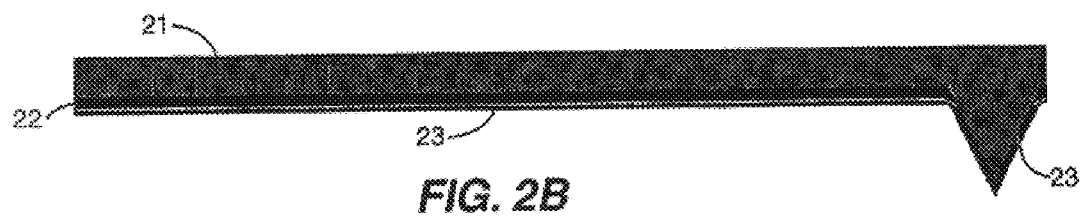
Figure 2C:

Referring now to FIG. 2A, there can be seen a conventional cantilever 21 and tip 21a that has been coated along cantilever 21 with photoresist layer 22. As will be hereinafter explained, photoresist layer 22 does not extend over tip 21a. after the application of photoresist layer 22, ferromagnetic layer 23 is applied to the entire cantilever 21 and tip 21a as shown in FIG. 2B. Subsequently, cantilever 21 and tip 21a are treated to remove ferromagnetic layer 23 from cantilever 21, but not from tip 21a as there was no photoresist on tip 21a, as shown in FIG. 2C.

In one embodiment of the present invention, the substrate of cantilever 21 and tip 21a are placed at the center of a vacuum chuck. In this configuration, tip 21a is approximately 1.75 mm from the axis of rotation the chuck. This placement of cantilever 21 allows photoresist to spread outward toward tip 21a when the chuck is rotating. Slow acceleration of approximately 22.5 krpm/sec and rotation speed of approximately 5000 rpm are used to force photoresist onto the thin surface of cantilever 21, without spinning all of the photoresist off cantilever 21. Slower acceleration and speed can either cause the resist not to coat cantilever 21, or to coat both cantilever 21 and tip 21a; both are undesirable. Faster acceleration and speed would cause the photoresist to be spun off of cantilever 21 altogether, or at best to leave most of cantilever 21 uncoated. The proper acceleration and speed provide complete coating of cantilever 21, but tip 21a remains uncoated because of surface tension. The photoresist used in this example was Microposit® 1813 (positive). The properly coated cantilever 21 with tip 21a is then baked on a hot plate for five (5) minutes at 100° C.

Following this baking step, tip 21a is cleaned in a vacuum with a 10 sec electron-cyclotron (ECR) Argon (Ar) etch, under the conditions of 100 V, at 300 W, and Ar at a flow rate of 15 ccm/sec. Tips 21a that are ECR cleaned tend to better retain ferromagnetic layer 23 longer in scanning applications than do tips 21a that have not been cleaned in this manner. In fact, ferromagnetic layer 23 has been found to come off tip 21a upon slight contact when the cleaning step is skipped. Without breaking vacuum, permalloy, from a $Ni_{89}Fe_{19}$ target is RF sputtered onto cantilever 21 and tip 21a. The sputter conditions for the production of a stress free ferromagnetic layer 23 are as follows:

Ar at 20 ccm/sec;

$5 \times 10^{-3}$ mTorr;

1.1 Å/sec; and power=200 W.

After the sputter process is completed, the permalloy is removed from cantilever 21 using a conventional acetone liftoff procedure. Thus, as shown in FIG. 2C, tip 21a is coated with the permalloy, while cantilever 21 is free of the permalloy. At this point, cleaning using ultrasound for 5–60 sec sometimes is required.

It will be understood by those with skill in this art that other materials and processes could be used for production of the present invention. For instance, cobalt or pure iron or other ferromagnetic materials could be sputtered onto cantilever 21 and tip 21a, it only being necessary to deposit a ferromagnetic layer 23 thereon. Additionally, other acceleration and chuck speeds could be used with good results. The example method is sound, but deviations from that method also may produce the invention.

The present invention provides numerous benefits over the prior art. Principal among these benefits are that with use of the present invention in MFM and MRFM there is no sensitivity to thermal expansion, no RF heating, only a weak interaction with external magnetic fields. Additionally, the present invention can be manufactured commercially, and can be employed in scanning topology. Because of the improved sensitivity of the present invention, it can be applied to the characterization of magneto-electric and spin transport devices. It can be used to characterize the dopant profiles in semiconducting devices, and to map biological molecules such as proteins.

Importantly, the present invention can be applied to the burgeoning field of quantum computing since it can operate on and characterize single electron spin devices. The invention can provide direct magnetic resonance readout because of the high sensitivity mechanical detection it is capable of achieving.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of producing a layer of thin ferromagnetic coating on the tip of a cantilever used as a resonator in magnetic resonance force microscopy and magnetic force microscopy comprising the steps of:

spinning said cantilever in the presence of a photoresist such that said photoresist spreads along said cantilever but not onto said incorporated tip;

sputtering a ferromagnetic layer onto said cantilever and said incorporated tip;

removing said ferromagnetic layer from said cantilever, but not from said incorporated tip.

2. The method as described in claim 1, further comprising the step of first cleaning said incorporated tip performed prior to said sputtering step.

3. The method as described in claim 2, wherein said cleaning step uses an electron-cyclotron etch.

4. The method as described in claim 2, wherein said electron-cyclotron etch is conducted at a voltage of 100 V, a power of 300 W, and a flow of Argon at a rate of 15 ccm/sec.

5. The method as described in claim 1, wherein said spinning step spins said cantilever at an acceleration of 22.5 krpm/sec and a velocity of 5000 rpm.

6. The method as described in claim 1, further comprising the step of baking said cantilever after said spinning step.

7. The method as described in claim 1, wherein said cantilever is baked for five (5) minutes at a temperature of 100° C.

8. The method as described in claim 1, wherein said sputtering step is performed with the conditions of a flow of Argon at 20 ccm/sec, a pressure of $5 \times 10^3$ mTorr, a power of 200 W at 1.1 Å/sec.

9. The method as described in claim 1, further comprising the step of second cleaning said cantilever performed after said removing step.

10. The method as described in claim 9, wherein said second cleaning step comprises ultrasonic cleaning.

11. The method as described in claim 1, wherein said removing step uses acetone to remove said ferromagnetic material.

* * * * *